(12) United States Patent
Keatley

(10) Patent No.: US 10,899,400 B2
(45) Date of Patent: Jan. 26, 2021

(54) FIFTH WHEEL HITCH SUPPORT ASSEMBLY

(71) Applicant: SAF-HOLLAND, Inc., Holland, MI (US)

(72) Inventor: Justin D. Keatley, Zeeland, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 616 days.

(21) Appl. No.: 15/490,149

(22) Filed: Apr. 18, 2017

(65) Prior Publication Data

US 2017/0217513 A1    Aug. 3, 2017

Related U.S. Application Data

(63) Continuation of application No. 14/445,739, filed on Jul. 29, 2014, now Pat. No. 9,656,702, which is a continuation-in-part of application No. 13/667,660, filed on Nov. 2, 2012, now Pat. No. 8,801,036.

(60) Provisional application No. 61/556,568, filed on Nov. 7, 2011.

(51) Int. Cl.
| | |
|---|---|
| *B62D 53/08* | (2006.01) |
| *B62D 21/05* | (2006.01) |
| *B62D 21/09* | (2006.01) |
| *B60D 1/44* | (2006.01) |
| *B62D 21/02* | (2006.01) |
| *B60D 1/01* | (2006.01) |
| *B60D 1/48* | (2006.01) |
| *B62D 65/02* | (2006.01) |

(52) U.S. Cl.
CPC ......... *B62D 53/0814* (2013.01); *B60D 1/015* (2013.01); *B60D 1/44* (2013.01); *B60D 1/488* (2013.01); *B62D 21/02* (2013.01); *B62D 21/05* (2013.01); *B62D 21/09* (2013.01); *B62D 53/08* (2013.01); *B62D 53/0807* (2013.01); *B62D 65/02* (2013.01); *Y10T 29/49492* (2015.01)

(58) Field of Classification Search
CPC ...... B62D 53/0814; B62D 65/02; B62D 1/44; B62D 21/09; B62D 21/02; B62D 53/08; B62D 1/488; B62D 1/015; B62D 21/05; B62D 53/0807; Y10T 29/49492
USPC ....................................................... 280/495
See application file for complete search history.

(56) References Cited

U.S. PATENT DOCUMENTS

| | | | | |
|---|---|---|---|---|
| 3,241,860 A | * | 3/1966 | Janeway | ............ B62D 53/0807 |
| | | | | 280/438.1 |
| 7,108,274 B2 | * | 9/2006 | Laarman | ............ B62D 53/0807 |
| | | | | 280/407.1 |
| 8,801,036 B2 | | 8/2014 | Keatley | |

* cited by examiner

*Primary Examiner* — Jacob D Knutson
*Assistant Examiner* — Felicia L Brittman
(74) *Attorney, Agent, or Firm* — Price Heneveld LLP

(57) ABSTRACT

A vehicle accessory mounting assembly for mounting a vehicle accessory to a vehicle fame assembly includes first and second support members adapted to couple to the frame assembly, a support assembly that includes first and second portions respectively slidably positionable along a length of the first and second support members and selectively engaging the first and second support members to lock the first and second portions at a selected position along the length of the first and second support members, a center portion having first and second portions, wherein the first and second ends of the center portion are adapted to couple with the first and second portions subsequent to the first and second portions being positioned along the length of the first and second portions, and a vehicle accessory arrangement coupled to the support assembly.

34 Claims, 10 Drawing Sheets

FIFTH WHEEL HITCH SUPPORT ASSEMBLY

CROSS REFERENCE TO RELATED APPLICATIONS

This application is a continuation of U.S. patent application Ser. No. 14/445,739, filed on Jul. 29, 2014, entitled "FIFTH WHEEL HITCH SUPPORT ASSEMBLY," which is a continuation-in-part of U.S. patent application Ser. No. 13/667,660, filed on Nov. 2, 2012, entitled "FIFTH WHEEL HITCH SUPPORT ASSEMBLY," the entire disclosures of which are incorporated herein by reference.

BACKGROUND OF THE INVENTION

The present invention relates to a fifth wheel mounting assembly and in particular to a novel mounting and arrangement to support various vehicle component arrangements from a vehicle frame assembly and allowing assembly of the vehicle component arrangements prior to attachment of the vehicle components to the vehicle frame assembly at variably selectable position along a length of the vehicle frame assembly.

Fifth wheel coupling systems are used in a wide variety of applications for coupling heavy duty trailers to associated tractors, as well as for coupling recreational vehicles with associated towing vehicles. FIG. 1 illustrates a typical prior construction of a tractor frame and a fifth wheel mounting system 10 for tractor/trailer applications. As illustrated, the tractor frame and mounting system 10 includes a pair of parallel frame rails 12 spaced apart and supported by a suspension 14, and supporting a drive train (not shown) and a fifth wheel coupling apparatus 16 for connecting a trailer to the tractor. While the frame rails 12 are illustrated as ending under a deck 17 it is noted that in the instant example the rails 12 continue forwardly of the deck 17 and extend under a cab of the tractor and support the cab and an engine of the tractor. It is further noted that the overall tractor assembly is utilized for illustrative purposes only, and that the present inventive assembly may also be incorporated into trailer assemblies.

The coupling apparatus 16 includes a fifth wheel hitch plate 20 and a mounting bracket and base plate assembly 18 configured to connect the fifth wheel hitch plate 20 to the frame rails 12. The mounting bracket and base plate assembly 18 includes a pair of brackets 22 connected to ends of a base plate 24. The base plate 24 is constructed of a planar sheet of steel that includes a pair of mounting brackets 26 extending upwardly from a top surface of the base plate 24. As illustrated, the mounting brackets 26 are fixedly welded to the base plate 24, while the base plate 24 is fixedly welded to the brackets 22. The coupling apparatus 16 is connected to the frame rails 12 by placing ends of the base plate 24 over the top surface of the frame rails 12 and by inserting fasteners (not shown) through the brackets 22 and into the frame rails 12. Therefore, the brackets 22 assist in connecting the coupling apparatus 16 to the frame rails 12 of the tractor. Each mounting bracket 26 of the mounting bracket and base plate assembly 18 includes an elongated aperture 28 therein configured to accept conventional attachment structure (not shown) for connecting the fifth wheel hitch plate 20 to the base plate 24. A separate cross-frame member 30 is located beneath the base plate 24 and extends between the frame rails 12, thereby structurally supporting the base plate 24 and the frame rails 12. Prior art systems like this and others requires the base plate or cross member 24 to be coupled to the attachment of the mounting bracket 26 thereby requiring the overall dimensions of the assembly to be customized for each and every application of the various spacing between the frame rails currently in wide use.

Accordingly, a fifth wheel mounting assembly is provided that decreases construction and assembly costs, while simultaneously reducing the weight and overall complexity of the assembly, and further allowing for the support of various vehicle component arrangements from a single, adjustable support platform.

SUMMARY OF THE INVENTION

One aspect of the present invention is to provide a heavy duty vehicle accessory mounting assembly for mounting a heavy duty vehicle accessory to a vehicle frame assembly including a first frame member and a second frame member extending substantially parallel with the first frame member, the mounting assembly includes a first support member adapted to couple to the first frame member of the vehicle frame assembly, a second support member adapted to couple to the second frame member of a vehicle frame assembly, and a support assembly. The support assembly includes a first portion slidably positionable along a length of the first support member, and selectively engaging the first support member to lock the first portion at a selected position along the length of the first support member, a second portion slidably positionable along a length of the second support member, and selectively engaging the second support member to lock the second portion at a selected position along the length of the second support member, and a center portion. The center portion includes a first end coupled to the first portion and a second end coupled to the second portion, wherein the first end of the center portion is adapted to couple with the first portion subsequent to the first portion being positioned along the length of the first support portion, and wherein the second end of the center portion is adapted to couple with the second portion subsequent to the second portion being position along the length of the second support portion. The mounting assembly further includes a vehicle accessory arrangement coupled to the support assembly.

Another aspect of the present invention is to provide a method for mounting a heavy duty vehicle accessory to a vehicle frame assembly, the method including providing a first vehicle frame member, providing a second vehicle frame member extending substantially parallel with the first vehicle frame member, providing a first support member, coupling the first support member to the first frame member, providing a second support member, and coupling the second support member to the second frame member. The method further comprises providing a support assembly that includes a first portion slidably positionable along a length of the first support member, a second portion slidably positionable along a length of the second support member, and a center portion having a first end and a second end. The method further still comprises positioning the first portion of the support assembly along the length of the first support member to a first selected position, locking the first portion to the first support member at the first selected position, positioning the second portion of the support assembly along the length of the second support member to a second selected position, locking the second portion to the second support member at the second selected position, coupling the first end of the center portion of the support assembly to the first portion subsequent to positioning the first portion along the length of the first support member, coupling the second end of the center portion of the support assembly to the second portion subsequent to positioning the second portion along the length of the second support member, providing a vehicle accessory arrangement, and coupling a vehicle accessory arrangement to the support assembly.

The present objects of the present invention are to provide a durable fifth wheel mounting assembly that includes an uncomplicated design that can be easily and quickly assembled, thereby reducing the associated manufacturing costs. The present inventive fifth wheel mounting assembly is economical to manufacture, results in a significant reduction of weight, and is particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
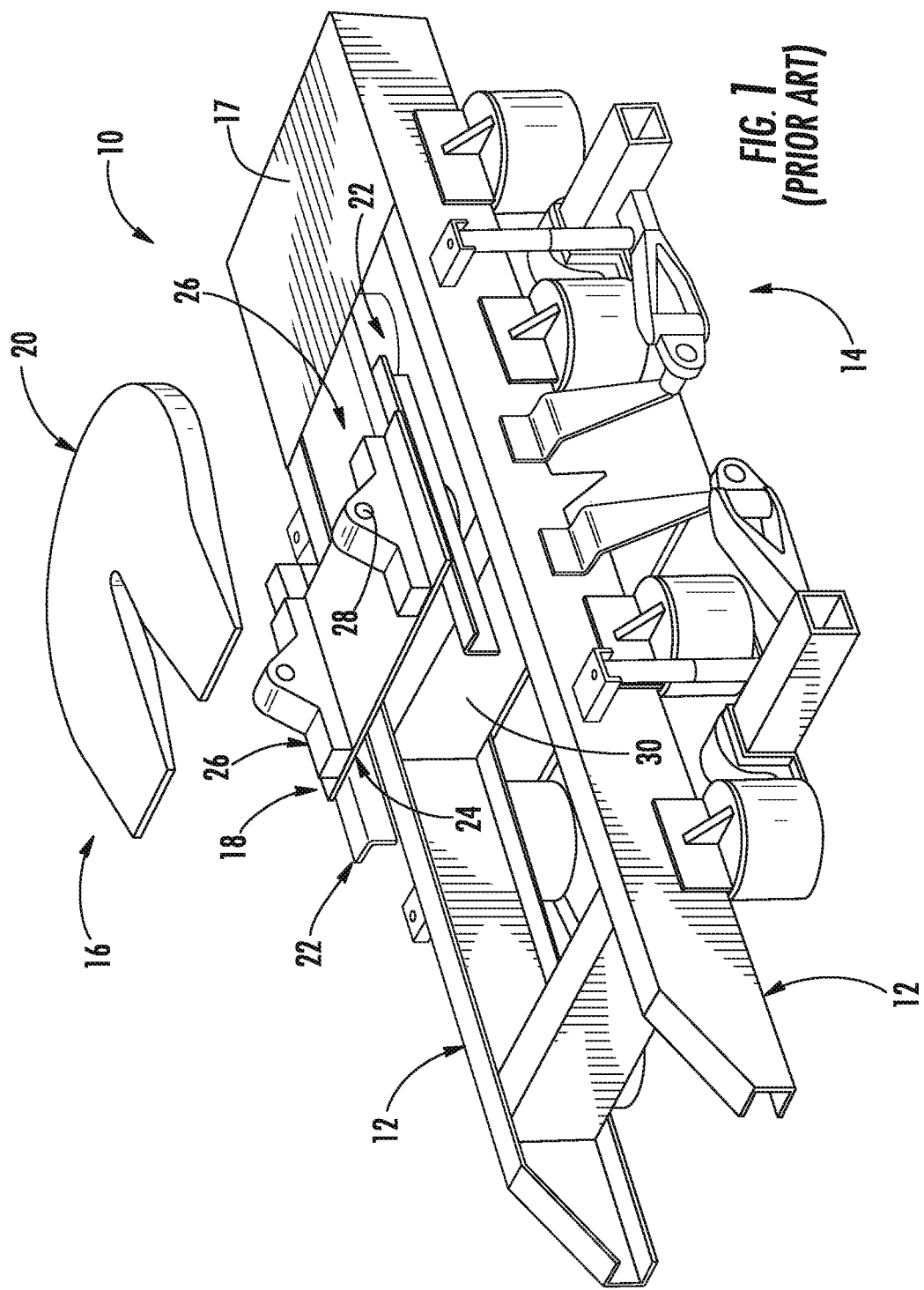
FIG. 1 is an exploded perspective view of a prior art fifth wheel mounting system.
Figure 2:
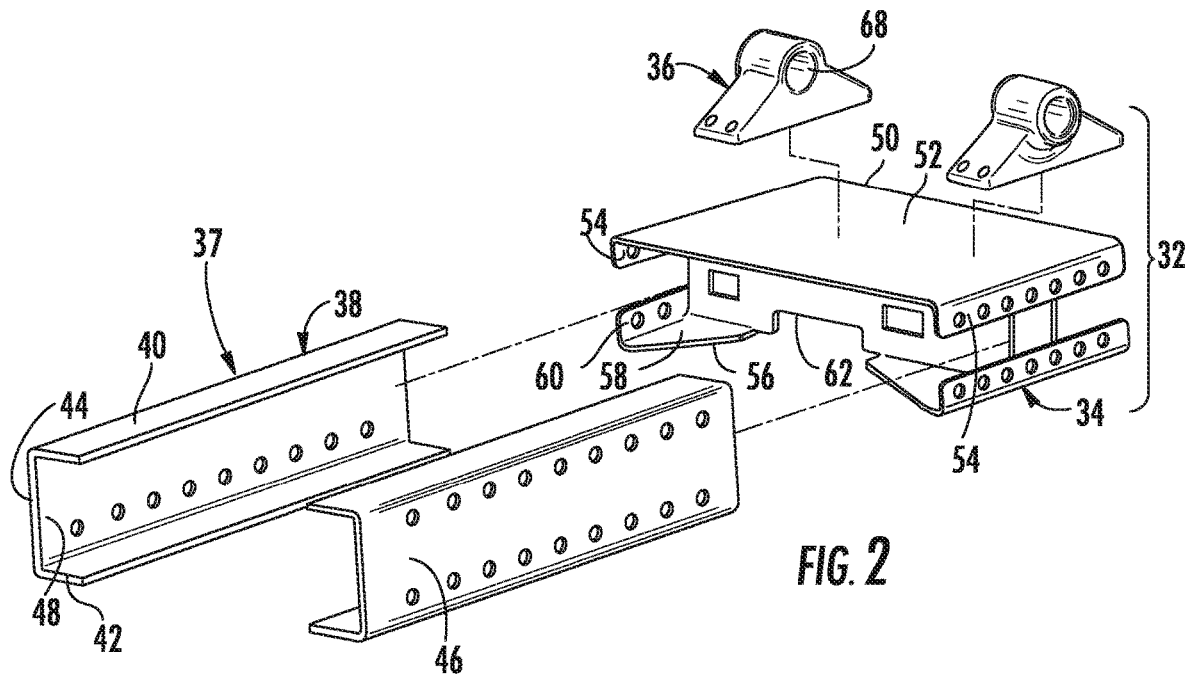
FIG. 2 is an exploded view of a first embodiment of a fifth wheel mounting assembly embodying the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 32 (FIGS. 2 and 3) generally designates a fifth wheel mounting assembly illustrating one embodiment of the present invention. In the illustrated example, the fifth wheel mounting assembly 32 includes a carriage assembly 34 supporting a pair of mounting brackets 36 from a pair of vehicle frame rails 38. Each of the vehicle frame rails 38 is provided a C-shaped cross-sectional configuration and includes an upper horizontal portion 40, a lower horizontal portion 42 and a vertical portion 44 extending between and connecting the upper horizontal portion 40 and the lower horizontal portion 42. Each vertical portion 44 includes an outwardly facing surface 46 and an inwardly facing surface 48.

The carriage assembly 34 includes an upper support member 50 having a planar mounting portion 52 and a pair of downwardly extending flanges 54 located at each edge of the mounting portion 52. The carriage assembly 34 further includes a pair of lower support members 56 each including an inwardly extending mounting portion 58 and an upwardly extending flange 60. The carriage assembly 34 further includes a cross-member 62 extending laterally between the frame rails 38 and secured to the upper support member 50 and the lower support members 56. The flanges 54 of the upper support member 50 and the flanges 60 of the lower support members 56 each include a plurality of longitudinally spaced apertures 64 that align with apertures 66 longitudinally spaced along the frame rails 38 and that are adapted to receive mechanical fasteners (not shown) therein, thereby securing the carriage assembly 34 to the inwardly facing surface 48 of each of the frame rails 38. The mounting brackets 36 are secured to an upper surface of the mounting portion 52 of the upper support member 50. Each mounting bracket 36 includes an inwardly exposed aperture 68 adapted to receive a mounting pin therein, so as to pivotally mount a fifth wheel hitch plate (not shown) to the carriage assembly 34.

The reference numeral 32a (FIG. 4) generally designates another embodiment of the present invention. Since the fifth wheel mounting assembly 32a is similar to the previously described fifth wheel mounting assembly 32, similar parts appearing in FIGS. 2 and 3 and FIG. 4 respectfully are represented by the same, corresponding reference numeral, except for the suffix "a" in the numerals of the latter. The fifth wheel mounting assembly 32a is similar to the fifth wheel mounting assembly 32 with the most notable exception being the replacement of the upper support member 50 with a pair of upper support members 70 each including a mounting portion 72 and a downwardly extending flange 74. In assembly, the mounting brackets 36a are secured to an upper surface of the mounting portion 72 of the respective upper support member 70. In the illustrated example, the mounting portion 58a of each of the lower support members 56a and the mounting portion 72 of each of the upper support members 70 are each provided with three rows of longitudinally spaced apertures 76 that receive mounting bolts 78 therein, thereby securing the lower support members 56 and the upper support members 70 to the cross member 62a. The offset nature of each of the rows of apertures 76 allows the adjustment of each of the lower support members 56a and the upper support members 70 in a fore and aft direction 79 with respect to the associated cross member 62a along reconfiguration of the carriage assembly 34a for particular applications.

Figure 4:
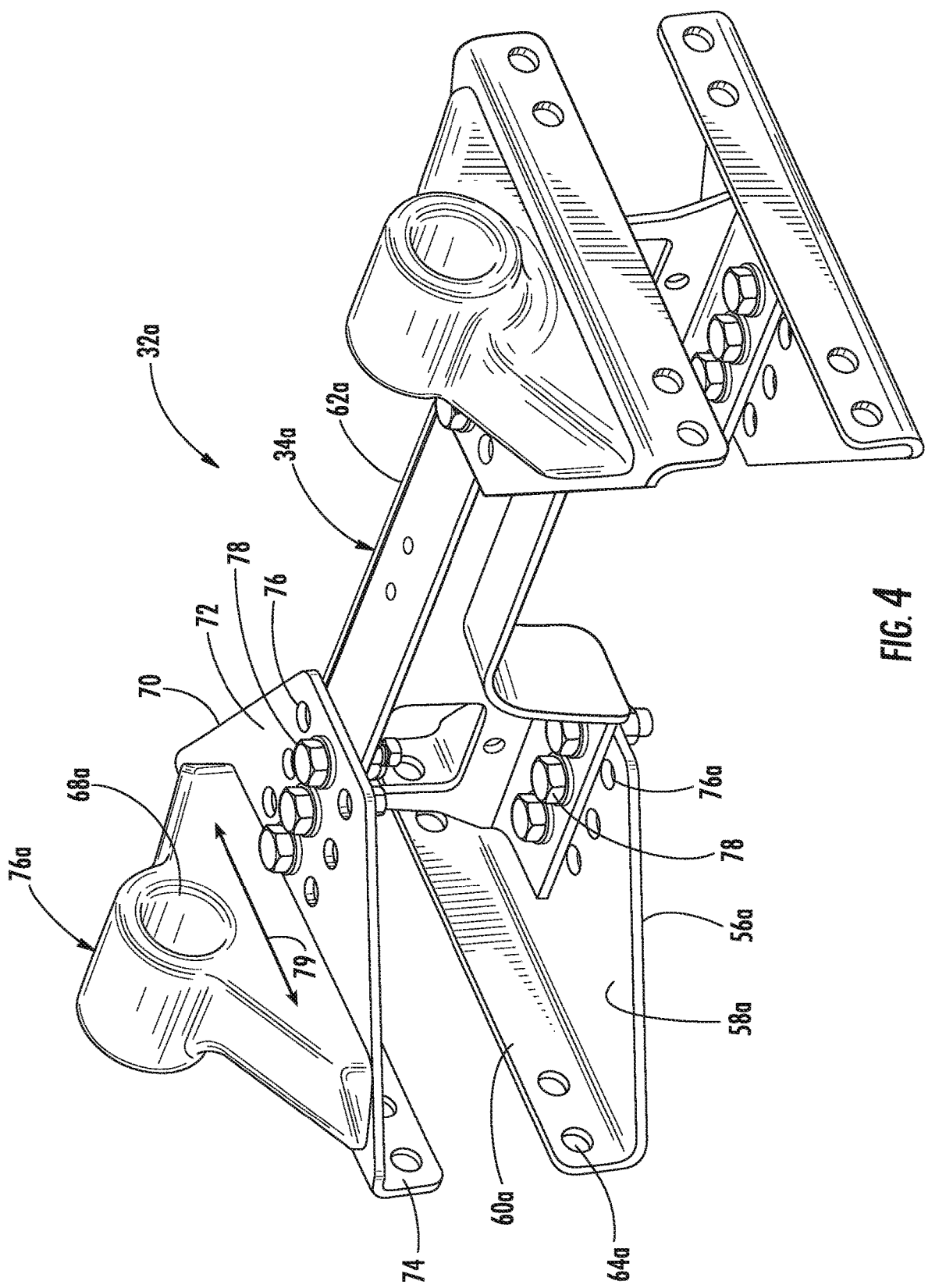
FIG. 4 is a perspective view of a second embodiment of the fifth wheel mounting assembly.
Figure 5:
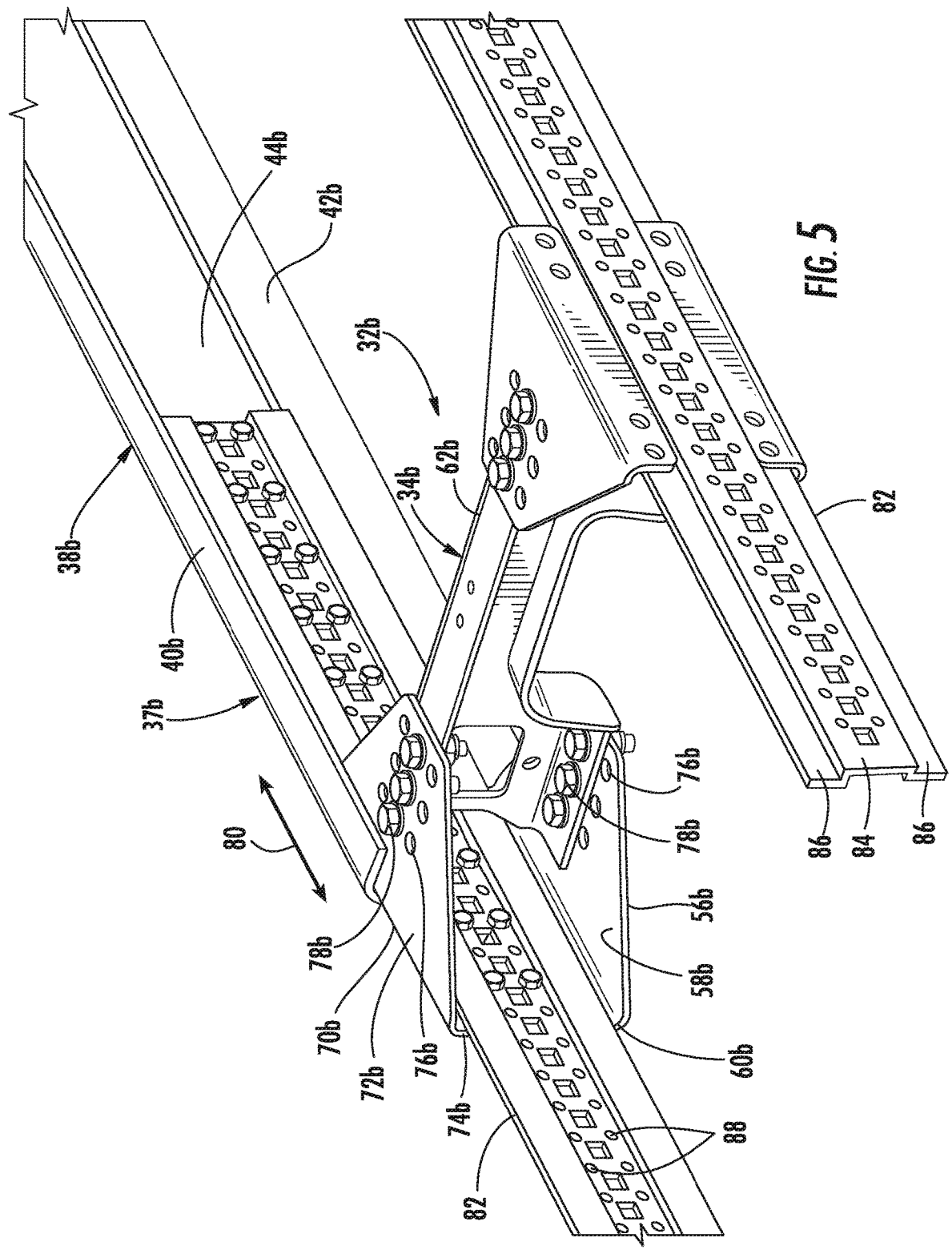
FIG. 5 is a perspective view of the second embodiment of the mounting assembly illustrated in assembly with frame members and rail members.
Figure 6:
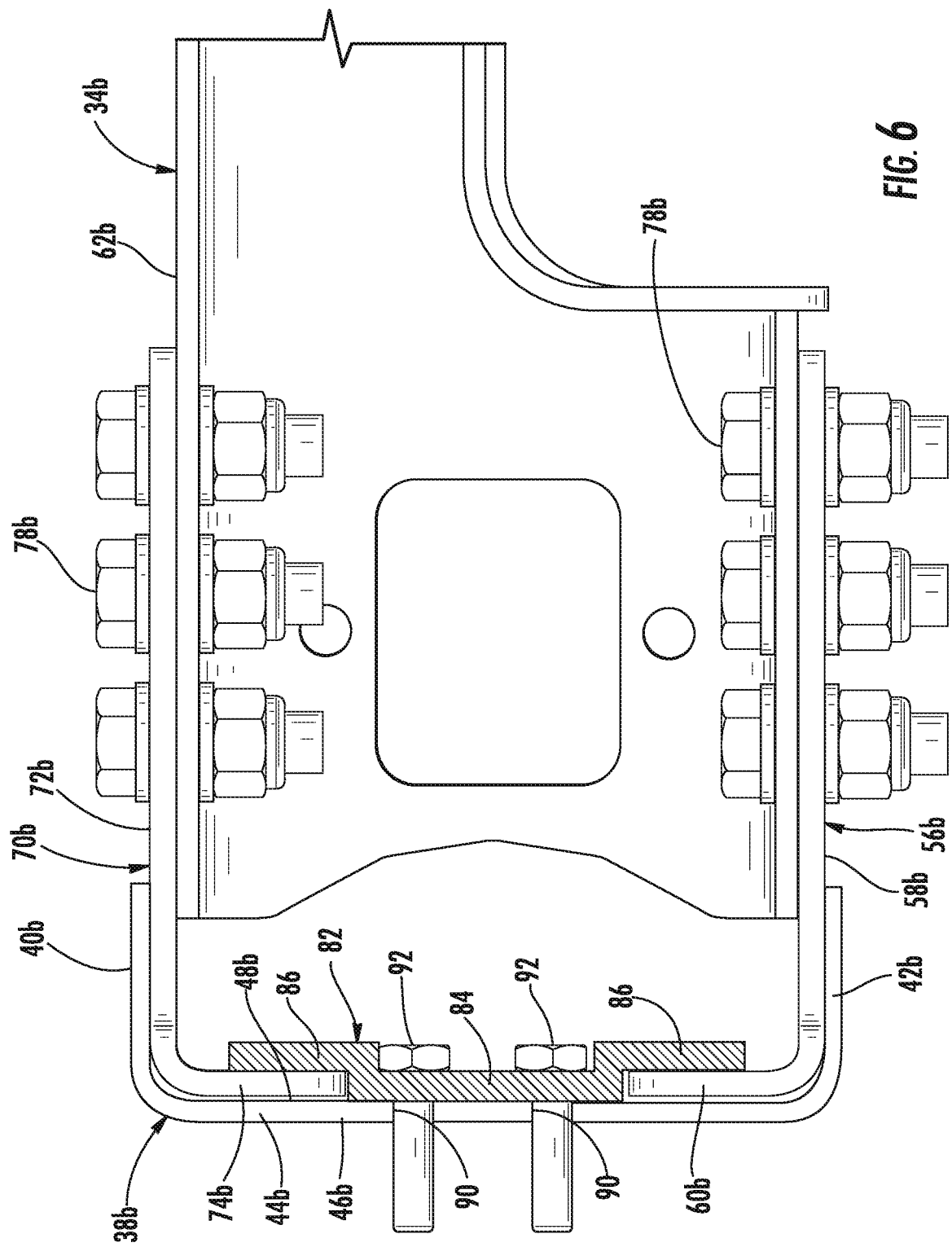
FIG. 6 is a partial end view of the second embodiment of the fifth wheel mounting assembly.
Figure 7A:
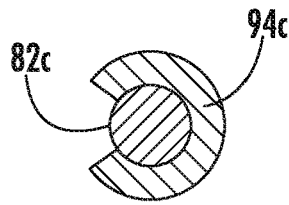
FIG. 7a is a cross-sectional end view of a first embodiment of a rail member and a carriage assembly of a fifth wheel mounting assembly.
Figure 7B:
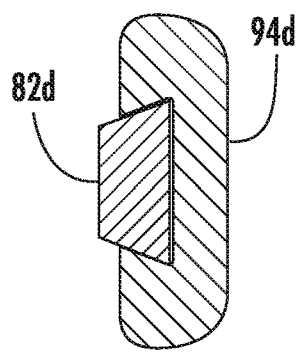
FIG. 7b is a cross-sectional end view of a second embodiment of a rail member and a carriage assembly.
Figure 7C:
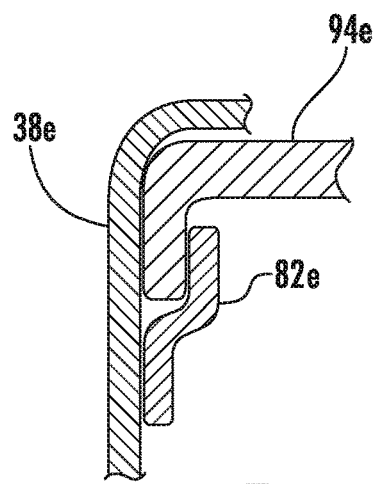
FIG. 7c is a cross-sectional end view of a third embodiment of a rail member and a carriage assembly.
Figure 7D:
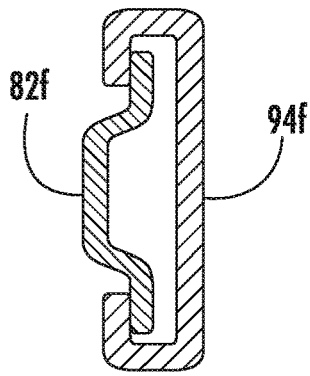
FIG. 7d is a cross-sectional end view of a fourth embodiment of a rail member and a carriage assembly.

The reference numeral 32b (FIGS. 5 and 6) generally designates another embodiment of the present invention, having a fifth wheel mounting assembly. Since the fifth wheel mounting assembly 32b is similar to the previously described fifth wheel mounting assembly 32a, similar parts appearing in FIG. 4 and in FIGS. 5 and 6 are respectfully represented by the same, corresponding reference numeral, except for the suffix "b" in the numerals of the latter. In the illustrated example, the fifth wheel mounting assembly 32b includes a carriage assembly 34b that is longitudinally repositionable in a direction 80 relative to the associated frame rails 38b. The fifth wheel mounting assembly 32b is similar to the fifth wheel mounting assembly 32a previously described, with the most notable exception being the inclusion of a pair of rail members 82 that extend longitudinally along the vehicle frame rails 38b and are secured to the inwardly facing surface 48b of the vertical portion 44b of the corresponding frame rail 38b. Specifically, each rail member 82 is provided with a hat-shaped cross-sectional configuration and includes a planar body portion 84, and a pair of planar flange portions 86 juxtaposed across and extending longitudinally along the body portion 84, and inwardly offset therefrom. The body portion 84 includes a pair of rows of longitudinally offset apertures 88, while the frame rails 38b include a pair of longitudinally spaced apertures 90 each adapted to receive bolts 92 therein, thereby securing the rail members 82 to the associated frame rails 38b. In assembly, the flange 60b of each of the lower support members 56b and the flange 74b of each of the upper support members 70b are trapped between the inwardly facing surface 48b of the vertical portion 44b of the associated frame rail 38b and the flange portion 86 of the associated rail member 82, thereby securing the carriage assembly 34b at a particular location along the length of the vehicle frame rails 38b.

As best illustrated in FIGS. 7a-7f, the rail member and carriage assembly may be provided in various cooperating geometrical configurations. Specifically, the flange portions of the upper and lower support members of the carriage assembly may be replaced with various geometrical configurations that cooperate with corresponding configurations of the rail members. For example, each of the rail members 82c (FIG. 7a) may be provided with a circular cross-sectional configuration, and the flange portion of either of the upper or lower support members replaced with a C-shaped engagement portion 94c; a rail member 82d (FIG. 7b) having a trapezoidal cross-sectional configuration with a corresponding engagement portion 94d; a rail member 82e (FIG. 7c) having a Z-shaped cross-sectional configuration with an L-shaped engagement portion 94e; a rail member 82f (FIGS. 7d and 7e) cooperating with a C-shaped engagement portion 94f; and, cooperating rail member 82f (FIG. 7f) fixed to a vertical portion 44f of an associated frame member, and between which an engagement portion of a carriage assembly (not shown) is received.

Figure 3:
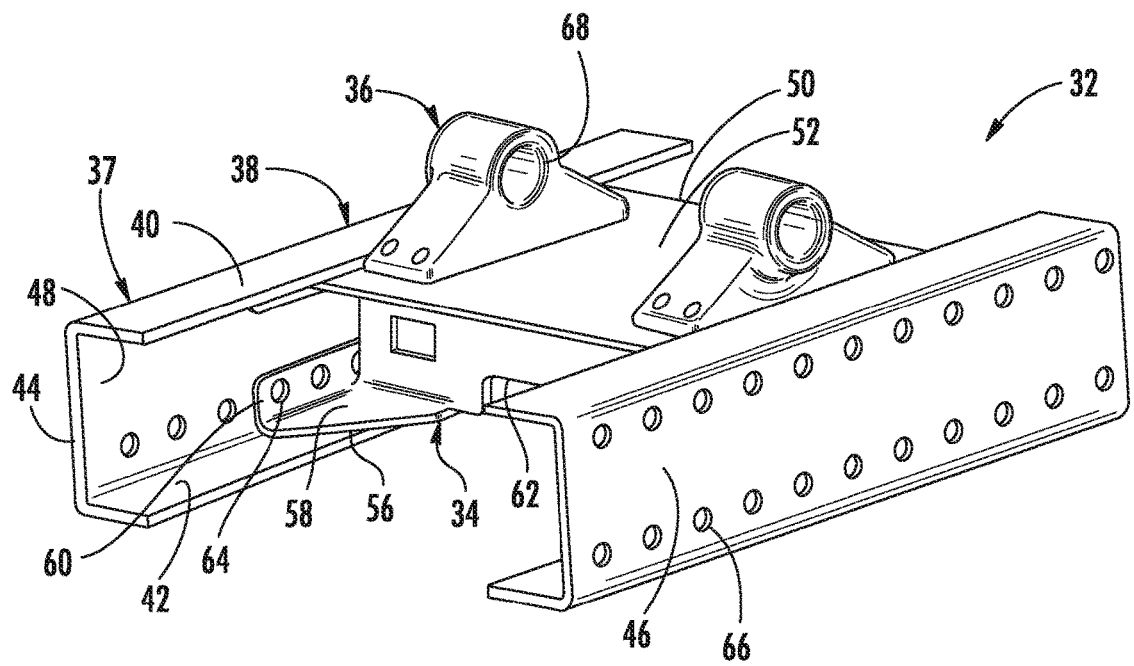
FIG. 3 is a perspective view of the first embodiment of the fifth wheel mounting assembly.
Figure 8:
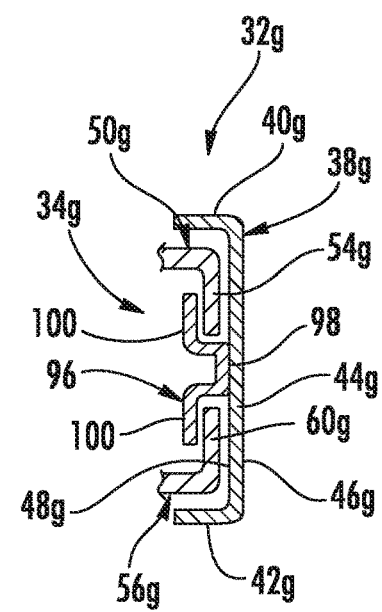
FIG. 8 is a partial perspective view of a third embodiment of the fifth wheel mounting assembly.
Figure 7E:
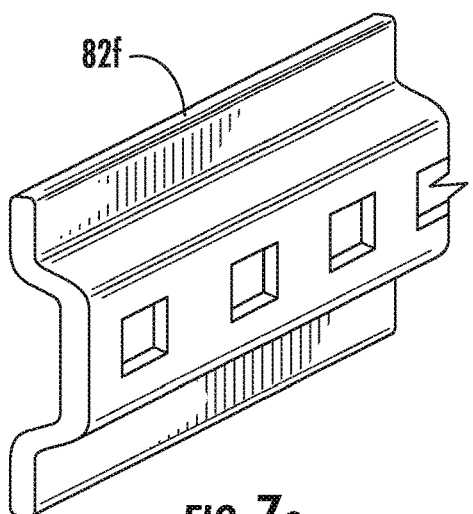
FIG. 7e is a partial perspective view of the fourth embodiment of the rail member.
Figure 7F:
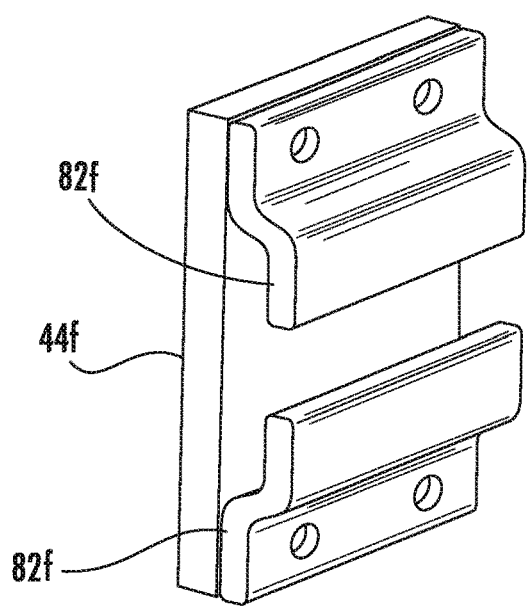
FIG. 7f is a partial perspective view of a fifth embodiment of a rail member secured to an associated vehicle frame rail.

The reference numeral 32g (FIG. 8) generally designates yet another embodiment of the present invention having a fifth wheel mounting assembly 32g. Since the fifth wheel mounting assembly 32g is similar to the previously described fifth wheel mounting assemblies 32, 32a, 32b, similar parts appearing in FIGS. 2-6 and in FIG. 8 are respectfully represented by the same, corresponding reference numeral, except for the suffix "g" in the numerals of the latter. In the illustrated example, the fifth wheel mounting assembly 32g includes a carriage assembly 34g that includes an upper support member 50g and a lower support member 56g having flange 54g and flange 60g, respectively. An adaptor rail 96 extends longitudinally along the associated frame rail 38f and includes a body portion 98 and a pair of flange portions 100 that extend longitudinally along and are juxtaposed across the body portion 98a, and are offset inwardly therefrom. In assembly, the body portion 98 of the adaptor rail 96 is secured to the inwardly facing surface 48f of the frame rail 38f and secures the carriage assembly 34f with respect to the associated frame rail 38f. The adaptor rail 96 may be used in conjunction with stationary systems, as illustrated in FIGS. 2-4, and longitudinally repositionable assemblies, as illustrated in FIGS. 5 and 6.

Figure 9:
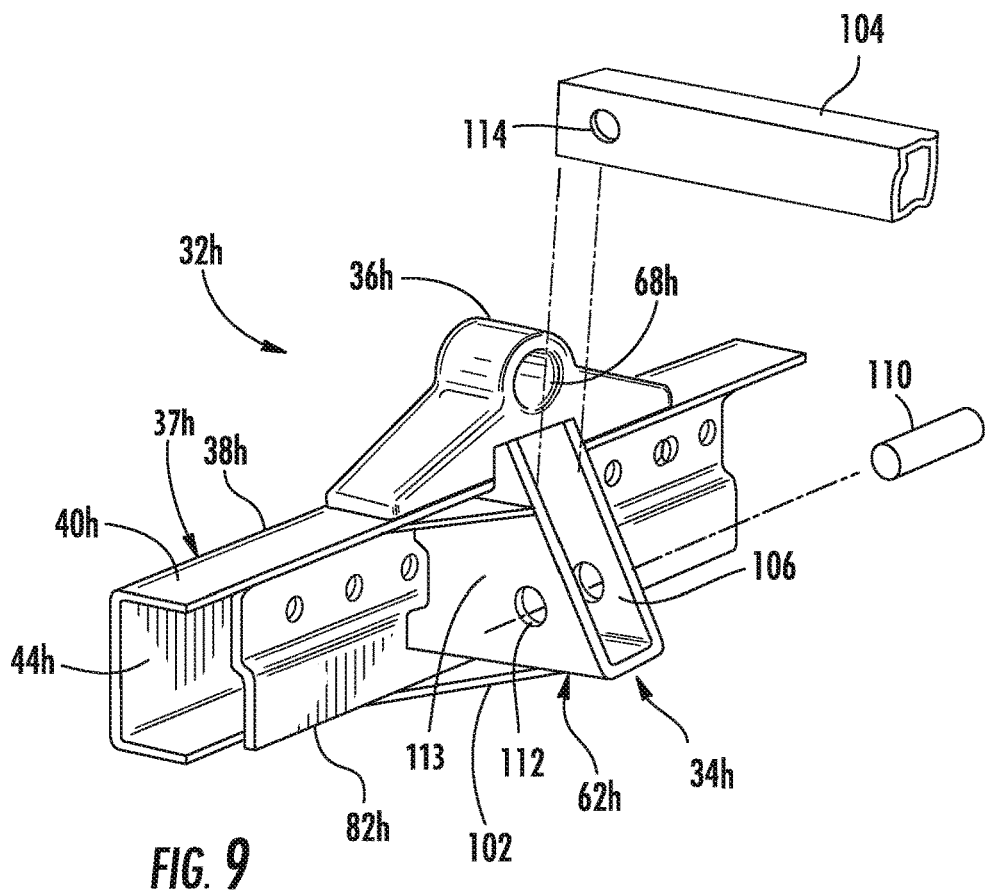
FIG. 9 is a partial perspective view of a fourth embodiment of the fifth wheel mounting assembly.

The reference numeral 32h (FIG. 9) generally designates another embodiment of the present invention having a fifth wheel mounting assembly. Since the fifth wheel mounting assembly 32h is similar to the previously described fifth wheel mounting assembly 32b, similar parts appearing in FIGS. 5 and 6 and in FIG. 9 are respectfully represented by the same, corresponding reference numeral, except for the suffix "h" in the numerals of the latter. In the illustrated example, the carriage assembly 34h includes a multiple-piece cross member 62h of which end portion 102 and a center portion 104 is illustrated, and which is described in further detail below. The end portion 102 is configured to cooperate and couple with the associated rail member 82h. As illustrated, the mounting bracket 36h is secured to the end portion 102 of the cross member 62h such that the mounting bracket 36h is positioned vertically above the upper horizontal portion 40h of the associated frame rail 38h. Specifically, the cross member 62h includes a first end portion 102, a second end portion (not shown) and a center portion 104 extending between and secured to each of the end portions. Each of the end portions 102 include a receiving pocket 106 within which the distal ends of the center portion 104 are received. The distal ends of the center portion 104 are secured within the pocket 106 of each of the end portions 102 by separate or integrated fasteners. In the illustrated example, a separate fastener 110 is received within apertures 112 of the end portions 102 and apertures 114 of the center portion 104, thereby securing the center portion 104 to the end portions 102.

Figure 10:
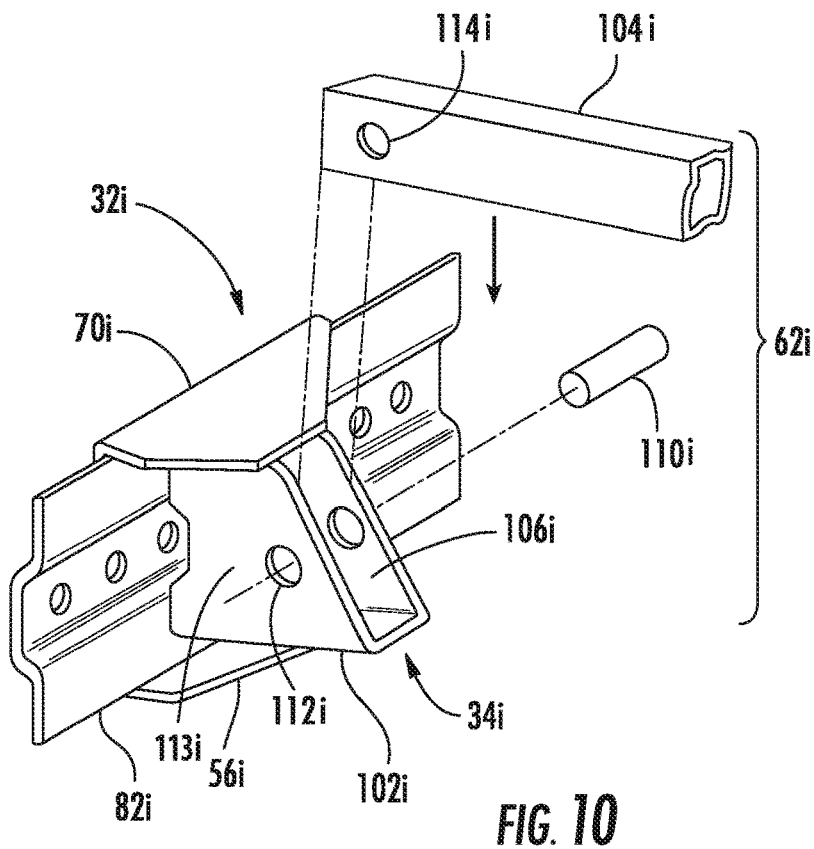
FIG. 10 is an exploded partial perspective view of a fifth embodiment of the fifth wheel mounting assembly.

The reference numeral 32i (FIG. 10) generally designates another embodiment of the present inventive fifth wheel mounting assembly. Since the fifth wheel mounting assembly 32i is similar to the previously described fifth wheel mounting assembly 32h, similar parts appearing in FIG. 9 and FIG. 10 are respectfully represented by the same, corresponding reference numeral, except for the suffix "i" in the numerals of the latter. In the illustrated example, the fifth wheel mounting assembly 32i includes a carriage assembly 34*i* that includes a multiple-piece cross member 62*i*. The cross member 62*i* includes a first end portion 102*i*, a second end portion (not shown) and a center portion 104*i* extending between and secured to each of the end portions. Each of the end portions 102*i* include a receiving pocket 106*i* within which the distal ends of the center portion 104*i* are received. The distal ends of the center portion 104*i* are secured within the pocket 106*i* of each of the end portions 102*i* by separate or integrated fasteners. In the illustrated example, a separate fastener 110*i* is received within apertures 112*i* of the end portions 102*i* and apertures 114*i* of the center portion 104*i*, thereby securing the center portion 104*i* to the end portions 102*i*.

Figure 11:
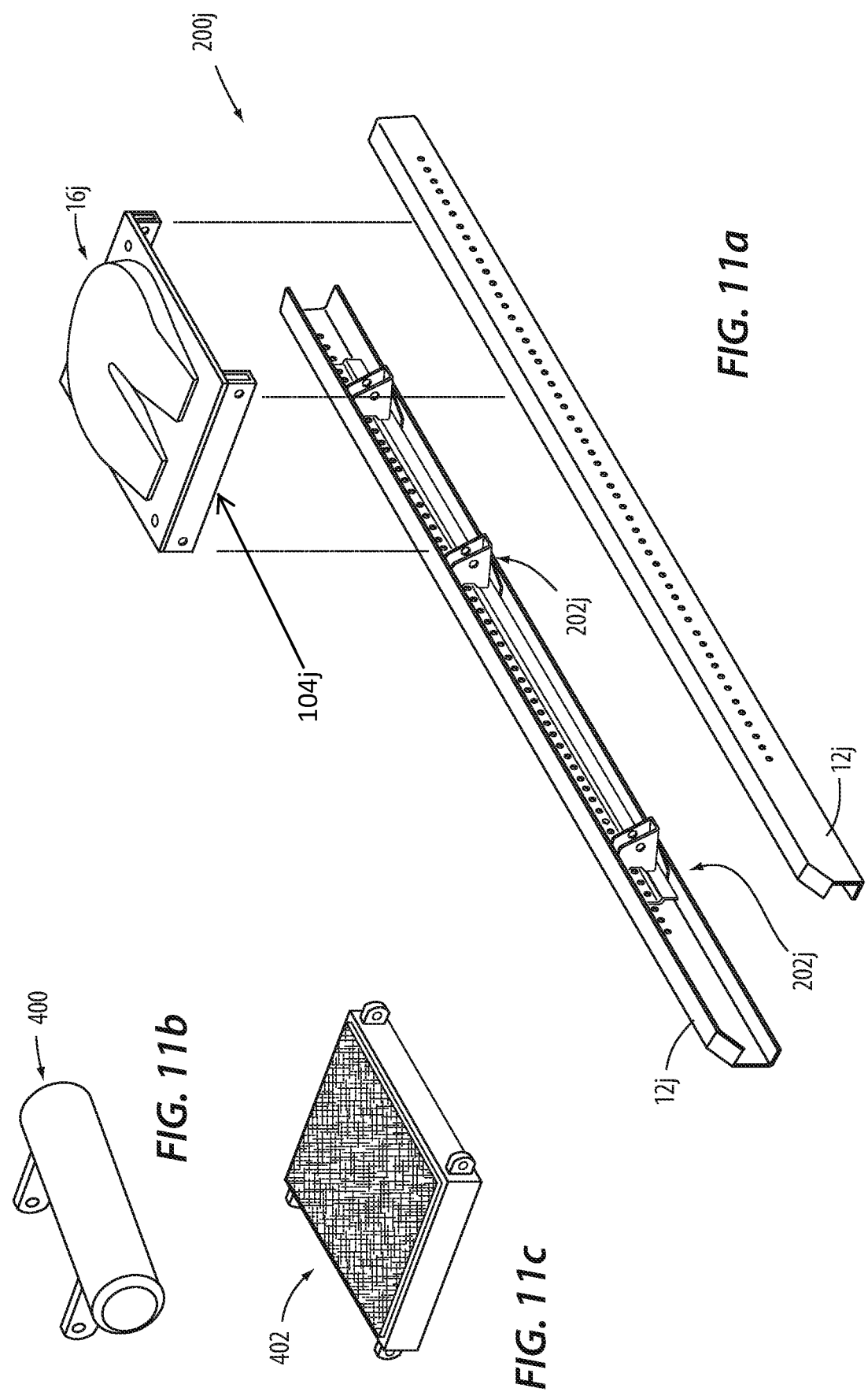
FIG. 11a is an explode perspective view of a vehicle accessory support grid system.
FIG. 11b is a perspective view of an air tank.
FIG. 11c is a perspective view of a catwalk.
Figure 12:
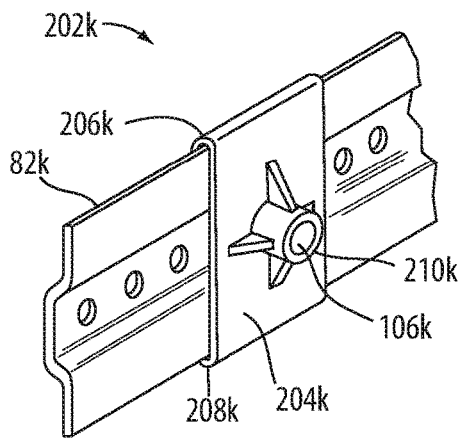
FIG. 12 is a perspective view of an alternative embodiment of a carriage assembly.
Figure 13:
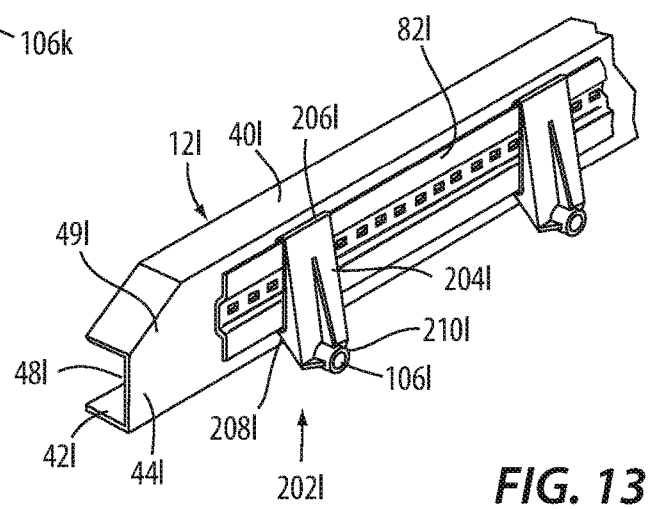
FIG. 13 is a perspective view of an alternative embodiment of a carriage assembly.

Each of the embodiments illustrated in FIG. 9 and FIG. 10 may be utilized to create a modular and adjustable vehicle accessory support grid system 200*j* (FIG. 11*a*) to support vehicle accessory arrangements, such as a fifth wheel coupling apparatus 16*j*, supported by a center portion 104*j* or other accessory arrangements as described below. In the illustrated examples, the support grid system 200*j* includes a plurality of carriage assemblies 202*j* similar in construction and configuration to the first end portion 102 of the cross member 62*h* and to the first end portion 102*i* of the cross member 62*i*. Other configurations for the carriage assembly may also be utilized depending upon the application and the geometrical configuration of the vehicle frame rails and the rail member, examples of which are illustrated in FIGS. 7*a*-7*f* and described above. Examples of other potential configurations include the carriage assembly 202*k* (FIG. 12) that includes a body portion 204*k* having an upwardly located and downwardly opening, C-shaped flange 206*k*, and a downwardly located and upwardly opening, C-shaped flange 208*k* wrapped about corresponding flanges of the rail member 82*k*. The carriage assembly 202*k* further includes a circularly shaped receiving pocket 106*k* defined within an inwardly-extending support boss 210*k* fixedly attached to the body portion 204*k*. Another example includes the carriage assembly 202*l* (FIG. 13) that includes a body portion 204*l* and flanges 206*l*, 208*k* similar to the body portion 204*k* and the flanges 206*k*, 208*k* described above, with the body portion 204*l* downwardly elongated such that the support boss 210*l* and receiving pocket 106*l* are positioned substantially below the vehicle frame rail 12*l* and the rail member 82*l*. It is noted that the rail member 82*l* is attached to an outwardly-facing surface 49*l* of the associated vehicle frame rail 12*l*, thereby allowing variously vehicle component arrangements to be supported outside of the space between the vehicle frame rails.

Figure 14A:
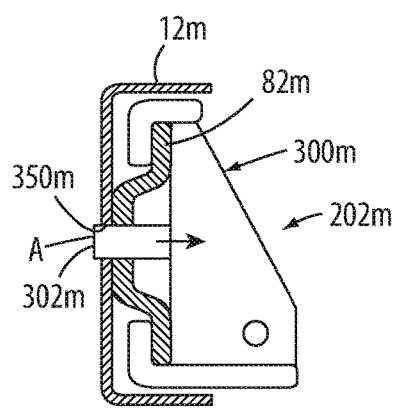
FIG. 14a is an end view of a locking assembly or arrangement illustrated in a locked position.
Figure 14B:
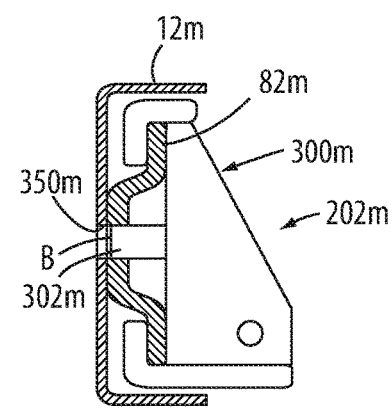
FIG. 14b is an end view of the locking assembly or arrangement illustrated in an unlocked position.
Figure 14C:
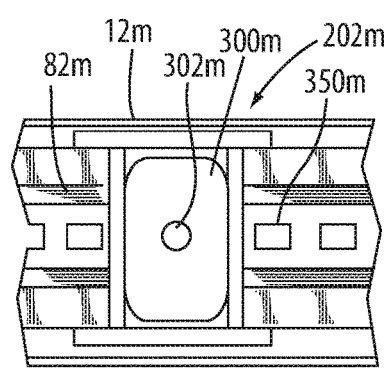
FIG. 14c is a side view of the locking assembly or arrangement.
Figure 15:
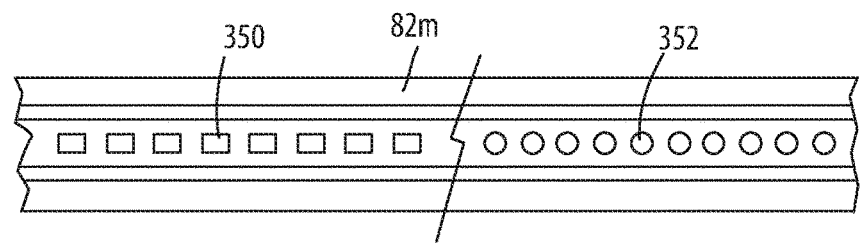
FIG. 15 is a side view of embodiments of a support rail.
Figure 16:
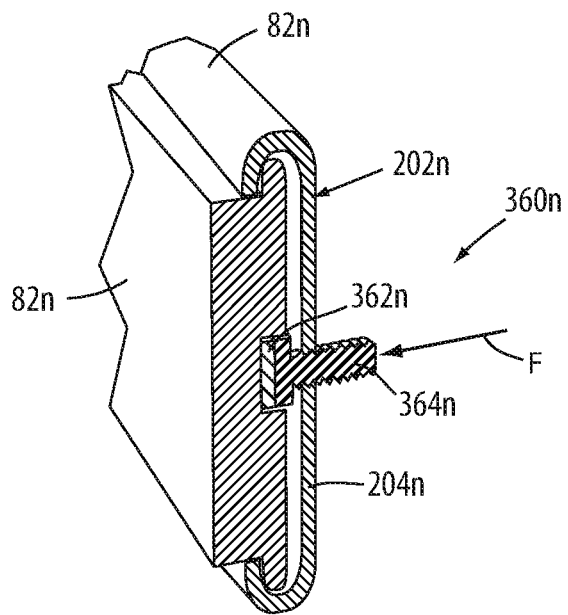
FIG. 16 is an end view of an alternative embodiment of the locking assembly.
Figure 17:
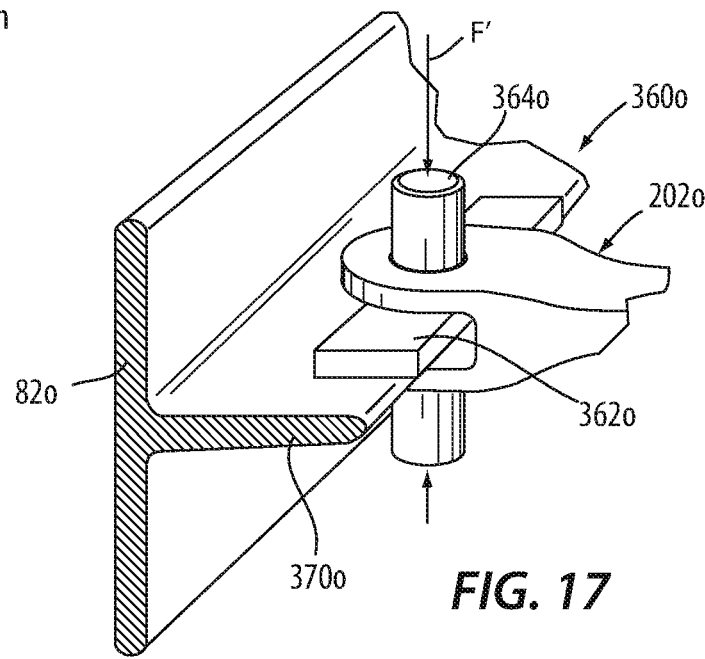
FIG. 17 is an end view of another alternative embodiment of the locking assembly.

The variously configured carriage assemblies include positional locks that lock the carriage assembly at a selected position along the length of the associated rail member. For example, the carriage assembly may include a retractable pin lock 300*m* (FIGS. 14*a*-14*c*) which may be spring biased towards an engaged position. The pin lock 300*m*, or alternatively configured locking arrangement, selectively engages the square-shaped 350 (FIG. 15) or round-shaped 352 apertures of the support rail, although alternatively configured apertures may be utilized. In the illustrated example, the pin lock 300*m* includes a pin member 302*m* moveable between a locked position A (FIG. 14*a*), wherein the pin member 302*m* engages a selected aperture 350*m* and locks the carriage assembly 202*m* at a selected position along the length of the rail member 82*m*, and an unlocked position B (FIG. 14*b*), wherein the pin member 302*m* is retracted from engagement with any of the apertures 350*m* and the carriage assembly 202*m* is free to slide along the length of the rail member 82*m*. Alternatively, the locking assembly may include a clamping arrangement 360*n* (FIG. 16) that utilizes an applied friction to clamp the locking assembly to the support rail 82*h* at a position along the length of the support rail 82*n* without engaging an aperture within the support rail, thereby providing infinite adjustability and positioning of the supported vehicle accessory along the length of the vehicle frame. In the illustrated example, the clamping arrangement 360*n* includes a brake pad member 362*n* attached to an actuator portion 364*n* that is threadably received with the body portion 204*n* of the carriage assembly 202*n* such that actuation of the actuator portion 364*n* causes the brake pad member 362*n* to abut the rail member 82*n* and exert a force F thereon, thereby locking the carriage assembly 202*n* at a selected position along the length of the rail member 82*n*. In an alternative embodiment, the clamping arrangement 360*o* (FIG. 17) that includes a brake pad member 362*o* attached to an actuator portion 364*o* that is threadably received with the carriage assembly 202*o* such that actuation of the actuator portion 364*o* causes the brake pad member 362*o* to abut an inwardly-extending flange 370*o* at the T-shaped rail member 82*o* and exert a force F' thereon, thereby locking the carriage assembly 202*o* at a selected position along the length of the rail member 82*o*. It is noted that the threadable actuation of the actuation portions 364*n*, 364*o* may be replaced with sliding, pivoting, or other actuations, and that each actuation may be pneumatically, hydraulically and/or mechanically driven.

Figure 18:
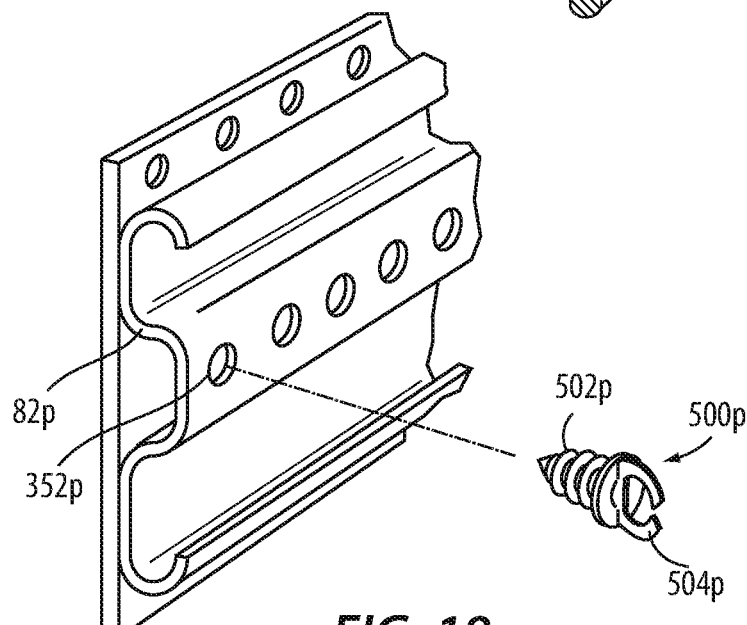
FIG. 18 is an exploded perspective view of a push-in clip and associated support rail.

As noted above, the vehicle accessory support grid system 200*j* may be utilized to support numerous and variously configured vehicle accessory arrangements at selected positions along the length of the vehicle frame rails. For example, the accessory support grid system 200*j* (FIG. 11*a*) may be utilized to support vehicle accessories such as the fifth wheel coupling apparatus 16*j*, an air tank 400 (FIG. 11*b*), catwalks 402 (FIG. 11*c*), engine mounts (not shown), cab connections/mounts (not shown), mud flaps (not shown), and the like. It is noted that the vehicle accessory support grid system 200*j* may also be utilized within trailer assemblies to support arrangements typically associated therewith, such as trailer suspension components, loading ramps, and the like. Further, the support rails may extend along the full length of the associated vehicle frame rails or only selected lengths thereof. Moreover, additional vehicle components may be supported by the support rails to increase the utility of the same. For example, hydraulic, control, air, electrical lines may be supported from the support rails 82*p* (FIG. 18) by supporting fasteners such as push-in clips 500*p*. In the illustrated example, the push-in clip 500*p* includes an engagement portion 502*p* having a Christmas-tree type configuration for pushably engaging an aperture 352*p* of the support rail 82*p*, and a support portion 504*p* adapted to detachably couple to the lines noted above.

In assembly, the carriage assemblies 202*j* may be positioned along the length of the vehicle frame rails 12*j*. The carriage assemblies 202*j* may then be locked into position along the length of the frame rails 12 by one of the various locking assemblies as described. The configuration of the carriage assemblies 202*j* allows one of the variously described vehicle accessory arrangements to be coupled to the carriage assemblies 202*j* subsequent to the carriage assemblies 202*j* being positioned along the support rails and locked thereto. The inventive configuration of the vehicle accessory support grid system provides increased flexibility in the use of the support system and reduces the significant number of specially produced components necessary to support and couple vehicle accessories to the diversely dimensioned and configured heavy duty truck and trailer frame configurations currently available on the market.

In the foregoing description, it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A heavy duty vehicle accessory mounting assembly for mounting a heavy duty vehicle accessory to a vehicle frame assembly including a first frame member and a second frame member extending substantially parallel with the first frame member, the mounting assembly comprising:
   a first support member adapted to couple to the first frame member of the vehicle frame assembly;
   a second support member adapted to couple to the second frame member of the vehicle frame assembly;
   a support assembly comprising:
      a first portion slidably positionable along a length of the first support member, and selectively engaging the first support member to lock the first portion at a selected position along the length of the first support member;
      a second portion slidably positionable along a length of the second support member, and selectively engaging the second support member to lock the second portion at a selected position along the length of the second support member; and
      a center portion having a first end coupled to the first portion and a second end coupled to the second portion, wherein the first end of the center portion is adapted to couple with the first portion subsequent to the first portion being positioned along the length of the first support member, and wherein the second end of the center portion is adapted to couple with the second portion subsequent to the second portion being positioned along the length of the second support member; and
   a vehicle accessory arrangement coupled to the support assembly;
   wherein the first support member includes a first plurality of locking apertures spaced along the length thereof, and wherein the first portion includes a locking arrangement that selectively engages the first plurality of locking apertures to lock the first portion at the selected position along the length of the first support member.

2. The mounting assembly of claim 1, wherein the first, second and center portions of the support assembly are configured such that the vehicle accessory may be coupled to the support assembly prior to the center portion being coupled to the first and second portions.

3. The mounting assembly of claim 1, wherein the vehicle accessory includes a fifth wheel support arrangement.

4. The mounting assembly of claim 3, wherein the fifth wheel support arrangement includes a first mounting member coupled to the first portion and adapted to pivotably support a fifth wheel plate and a second mounting member coupled to the second portion and adapted to pivotably support the fifth wheel plate, and wherein the first, second and center portions of the support assembly are configured such that the first mounting member may be coupled to the first portion and the second mounting member may be coupled to the second mounting portion prior to the center portion being coupled to the first and second portions.

5. The mounting assembly of claim 1, wherein the vehicle accessory includes at least one of a vehicle suspension arrangement, an engine mount arrangement, a cab support arrangement, a fender support arrangement, a mud flap, a cat walk, an air tank, and a ramp assembly.

6. The mounting assembly of claim 1, wherein the center portion is coupled to the first portion and the second portion at positions that are located between the first and second frame members of the vehicle frame assembly.

7. The mounting assembly of claim 1, wherein the first, second and center portions of the support assembly are configured such that at least a portion of the center portion is adapted to be positioned vertically lower than an uppermost surface of the first and second frame members.

8. The mounting assembly of claim 1, wherein the first, second and center portions of the support assembly are configured such that the center portion is adapted to be entirely positioned vertically lower than an uppermost surface of the first and second frame members.

9. The mounting assembly of claim 1, wherein the first, second and center portions of the support assembly are configured such that at least a portion of the vehicle accessory arrangement are adapted to be positioned vertically lower than an uppermost surface of the first and second frame members.

10. The mounting assembly of claim 1, wherein the first, second and center portions of the support assembly are configured such that the vehicle accessory arrangement is adapted to be entirely positioned vertically lower than an uppermost surface of the first and second frame members.

11. The mounting assembly of claim 1, wherein the first and second frame members each include a substantially vertical, inwardly-facing surface, wherein the first and second support members are configured to attach to and abut the inwardly-facing surface of the first and second frame members, respectively.

12. The mounting assembly of claim 1, wherein the first support member includes a first section configured to attach to the first frame member and a second section configured to define a first gap between the first support member and the first frame member, and the first portion of the support assembly is configured to slide within the first gap, and wherein the second support member includes a first section configured to attach to the first frame member and a second section configured to define a second gap between the first support member and the second frame member, and the second portion of the support assembly is configured to slide within the second gap.

13. The mounting assembly of claim 12, wherein the first and second support members each have a hat-shaped cross-sectional configuration that includes a U-shaped portion and a pair of flanges extending from the U-shaped portion opposite one another.

14. The mounting assembly of claim 1, wherein the first portion of the support assembly includes a first recess that receives the first end of the center portion of the support assembly, and the second portion of the support assembly includes a second recess that receives the second end of the center portion of the support assembly.

15. The mounting assembly of claim 14, wherein the first recess and the second recess are each upwardly-opening.

16. The mounting assembly of claim 1, wherein the second support member includes a second plurality of locking apertures spaced along the length thereof, and wherein the second portion includes a locking arrangement that selectively engages the second plurality of locking apertures to lock the second portion at the selected position along the length of the second support member.

17. The mounting assembly of claim 1, wherein the first and second portions frictionally clamp to the first and second support members, respectively, thereby locking the first and second portions along the lengths of the first and second support members, respectively.

18. A method for mounting a heavy duty vehicle accessory to a vehicle frame assembly including, the method comprising:
providing a first vehicle frame member;
providing a second vehicle frame member extending substantially parallel with the first vehicle frame member;
providing a first support member;
coupling the first support member to the first vehicle frame member;
providing a second support member;
coupling the second support member to the second vehicle frame member;
providing a support assembly that includes a first portion slidably positionable along a length of the first support member, a second portion slidably positionable along a length of the second support member, and a center portion having a first end and a second end;
positioning the first portion of the support assembly along the length of the first support member to a first selected position;
locking the first portion to the first support member at the first selected position;
positioning the second portion of the support assembly along the length of the second support member to a second selected position;
locking the second portion to the second support member at the second selected position;
coupling the first end of the center portion of the support assembly to the first portion subsequent to positioning the first portion along the length of the first support member;
coupling the second end of the center portion of the support assembly to the second portion subsequent to positioning the second portion along the length of the second support member;
providing a vehicle accessory arrangement; and
coupling the vehicle accessory arrangement to the support assembly;
wherein the first support member includes a first plurality of locking apertures spaced along the length thereof, the first portion includes a locking arrangement that selectively engages the first plurality of locking apertures to lock the first portion at the selected position along the length of the first support member, and wherein locking the first portion along the length of the first support member includes engaging the first support member with the locking arrangement of the first portion.

19. The method of claim 18, wherein the step of coupling the vehicle accessory arrangement to the support assembly is conducted prior to the step of positioning the first portion of the support assembly along the length of the first support member and prior to the step of positioning the second portion of the support assembly along the length of the second support member.

20. The method of claim 18, wherein the step of providing the vehicle accessory arrangement includes providing a fifth wheel support arrangement.

21. The method of claim 20, wherein the step of coupling the vehicle accessory arrangement to the support assembly includes coupling a first mounting member to the first portion, wherein the first mounting member is adapted to pivotably support a fifth wheel plate, and coupling a second mounting member to the second portion, wherein the second mounting member is adapted to pivotably support the fifth wheel plate, and wherein the first mounting member is coupled to the first portion and the second mounting member is coupled to the second portion prior to the steps of positioning the first portion of the support assembly along the length of the first support member and positioning the second portion of the support assembly along the length of the second support member.

22. The method of claim 18, wherein the step of providing the vehicle accessory arrangement includes providing at least one of a vehicle suspension arrangement, an engine mount arrangement, a cab support arrangement, a fender support arrangement, a mud flap, a cat walk, an air tank, and a ramp assembly.

23. The method of claim 18, wherein the center portion is coupled to the first portion and the second portion at positions that are located between the first and second vehicle frame members of the vehicle frame assembly.

24. The method of claim 18, wherein the first, second and center portions of the support assembly are configured such that at least a portion of the center portion is positioned vertically lower than an uppermost surface of the first and second vehicle frame members.

25. The method of claim 18, wherein the first, second and center portions of the support assembly are configured such that the center portion is entirely positioned vertically lower than an uppermost surface of the first and second vehicle frame members.

26. The method of claim 18, wherein the first, second and center portions of the support assembly are configured such that at least a portion of the vehicle accessory arrangement is positioned vertically lower than an uppermost surface of the first and second vehicle frame members.

27. The method of claim 18, wherein the first, second and center portions of the support assembly are configured such that the vehicle accessory arrangement is entirely positioned vertically lower than an uppermost surface of the first and second vehicle frame members.

28. The method of claim 18, wherein the first support member includes a first section attached to the first frame member and a second section that defines a first gap between the first support member and the first frame member, and the first portion of the support assembly is slidably received within the first gap, and wherein the second support member includes a first section attached to the first frame member and a second section that defines a second gap between the first support member and the second frame member, and the second portion of the support assembly slidably received within the second gap.

29. The method of claim 28, wherein the first and second support members each have a cross-sectional configuration that includes a U-shaped portion and a pair of flanges extending from the U-shaped portion opposite one another.

30. The method of claim 18, wherein the first portion of the support assembly includes a first recess that receives the first end of the center portion of the support assembly, and the second portion of the support assembly includes a second recess that receives the second end of the center portion of the support assembly.

31. The method of claim 30, wherein the first recess and the second recess are each upwardly-opening.

32. The method of claim 18, wherein the second support member includes a second plurality of locking apertures spaced along the length thereof, the second portion includes a locking arrangement that selectively engages the second plurality of locking apertures to lock the second portion at the selected position along the length of the second support member, and wherein locking the second portion along the length of the second support member includes selectively engaging the second support member with the locking arrangement of the second portions.

33. The method of claim 18, wherein the steps of locking the first and second portions along the lengths of the first and second support members includes frictionally clamping the first and second portions to the first and second support members, respectively.

34. A method for mounting a heavy duty vehicle accessory to a vehicle frame assembly including, the method comprising:
   providing a first vehicle frame member;
   providing a second vehicle frame member extending substantially parallel with the first vehicle frame member;
   providing a first support member;
   coupling the first support member to the first vehicle frame member;
   providing a second support member;
   coupling the second support member to the second vehicle frame member;
   providing a support assembly that includes a first portion slidably positionable along a length of the first support member, a second portion slidably positionable along a length of the second support member, and a center portion having a first end and a second end;
   positioning the first portion of the support assembly along the length of the first support member to a first selected position;
   locking the first portion to the first support member at the first selected position;
   positioning the second portion of the support assembly along the length of the second support member to a second selected position;
   locking the second portion to the second support member at the second selected position;
   coupling the first end of the center portion of the support assembly to the first portion subsequent to positioning the first portion along the length of the first support member;
   coupling the second end of the center portion of the support assembly to the second portion subsequent to positioning the second portion along the length of the second support member;
   providing a vehicle accessory arrangement; and
   coupling the vehicle accessory arrangement to the support assembly;
   wherein steps of providing the first and second vehicle frame members includes providing each of the first and second vehicle frame members with a substantially vertical, inwardly-facing surface, and wherein the steps of coupling the first support member with the first vehicle frame member and the second support member with second vehicle frame member include attaching the first support member to the inwardly-facing surface of the first vehicle frame member such that the first support member abuts the inwardly-facing surface of the first vehicle frame member and attaching the second support member to the inwardly-facing surface of the second vehicle frame member such that the second support member abuts the inwardly-facing surface of the second vehicle frame member.

* * * * *

UNITED STATES PATENT AND TRADEMARK OFFICE
CERTIFICATE OF CORRECTION

PATENT NO. : 10,899,400 B2
APPLICATION NO. : 15/490149
DATED : January 26, 2021
INVENTOR(S) : Keatley It is certified that error appears in the above-identified patent and that said Letters Patent is hereby corrected as shown below:

On the Title Page

Abstract, Line 2:
"fame" should be — frame —

In the Specification

Column 1, Line 23:
"position" should be — positions —

Column 1, Line 31:
"includes" should be — include —

Column 1, Line 47:
"includes" should be — include —

Column 1, Line 67:
"requires" should be — require —

Column 2, Line 39:
"position" should be — positioned —

Column 3, Line 53:
"explode" should be — exploded —

Column 4, Line 64:
"respectfully" should be — respectively —

Column 5, Lines 13-14, 18:
"cross member" should be — cross-member —

Signed and Sealed this
Eleventh Day of June, 2024

Katherine Kelly Vidal
*Director of the United States Patent and Trademark Office*

Column 6, Line 13:
"respectfully" should be — respectively —

Column 6, Line 35:
"respectfully" should be — respectively —

Column 6, Lines 39, 45, 48:
"cross member" should be — cross-member —

Column 6, Line 40:
"is" ($1^{st}$ occurrence) should be — are —

Column 6, Line 50:
"include" should be — includes —

Column 6, Line 64:
"respectfully" should be — respectively —

Column 7, Lines 1-2:
"cross member" should be — cross-member —

Column 7, Line 5:
"include" should be — includes —

Column 7, Lines 23, 24:
"cross member" should be — cross-member —

Column 7, Line 46:
"variously" should be — various —

Column 8, Line 3:
"82h" should be — 82n —

In the Claims

Column 10, Claim 9, Line 24:
"are" should be — is —

Column 11, Claim 18, Line 9:
Delete "including"

Column 13, Claim 34, Line 16:
Delete "including"

Column 14, Claim 34, Line 20:
"includes" should be — include —

Column 14, Claim 34, Line 25:
After "with" insert -- the --